No. 761,486. PATENTED MAY 31, 1904.
A. W. HIGHT.
PIPE BAND AND FASTENING.
APPLICATION FILED SEPT. 16, 1903.
NO MODEL.
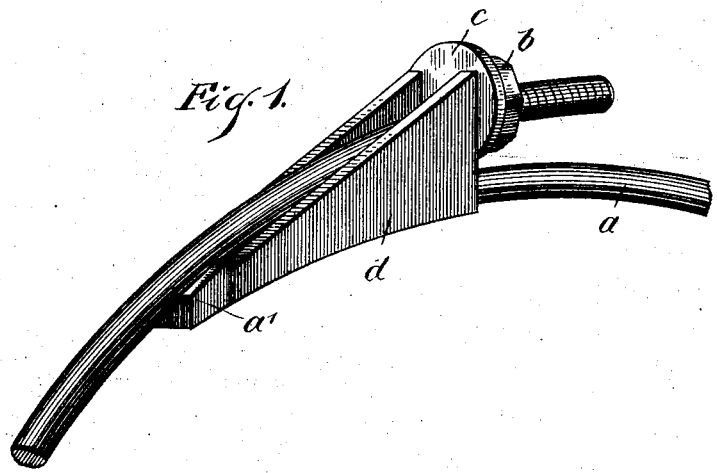
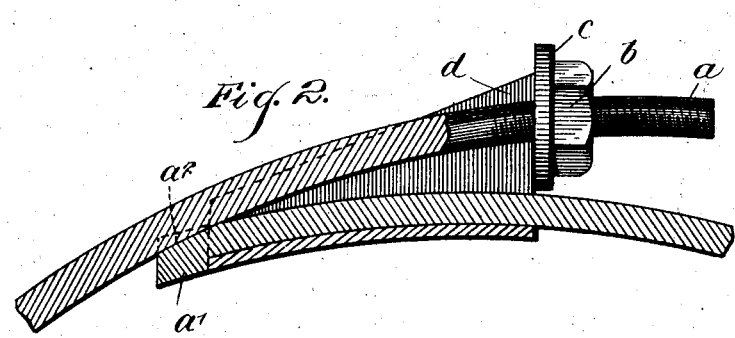
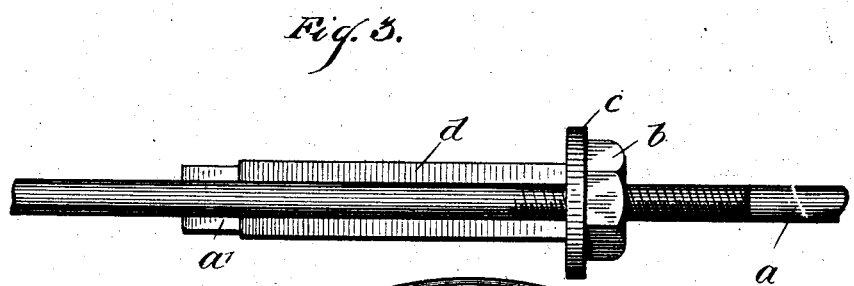
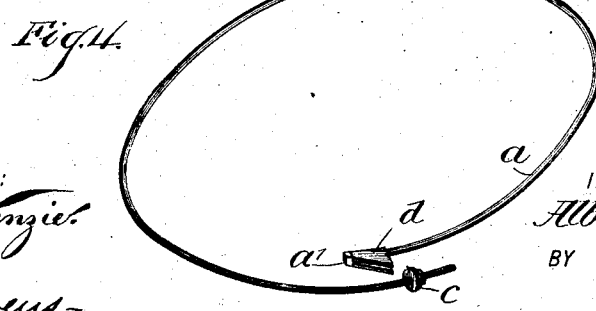
WITNESSES:
INVENTOR
Albert W. Hight
BY
ATTORNEYS No. 761,486. Patented May 31, 1904.

UNITED STATES PATENT OFFICE.

ALBERT W. HIGHT, OF BALLARD, WASHINGTON, ASSIGNOR TO BALLARD DROP FORGE CO., OF BALLARD, WASHINGTON, A CORPORATION OF WASHINGTON.

PIPE BAND AND FASTENING.

SPECIFICATION forming part of Letters Patent No. 761,486, dated May 31, 1904.

Application filed September 16, 1903. Serial No. 173,434. (No model.)

*To all whom it may concern:*

Be it known that I, ALBERT W. HIGHT, a citizen of the United States, and a resident of Ballard, in the county of King and State of Washington, have invented a new and Improved Pipe Band and Fastening, of which the following is a full, clear, and exact description.

This invention is designed especially for holding together the staves of stave-piping—that is to say, of piping formed of wooden staves laid longitudinally and bound together. The invention is, however, useful in various other connections, as will be apparent. For example, it may be used to advantage on water-tanks and the like.

The invention resides in certain peculiar constructions of the fastening and in the form and arrangement of the band or strap which coacts with the shoe.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a perspective view of the invention. Fig. 2 is a longitudinal section thereof. Fig. 3 is a plan view; and Fig. 4 is a perspective view of the entire band, showing the fastening device detached.

$a$ indicates the band, which is formed of a rod of wrought-iron or other material and is provided at one end with a head or enlargement $a'$, in which is formed a longitudinally-extending groove $a^2$. The other end of the band is threaded and adapted to carry a nut $b$ and washer $c$. The shoe $d$ is formed, preferably, of wrought-iron and is U-shaped in cross-sectional form, said shoe being tapered longitudinally, but having two square or approximately square ends.

In assembling the device the strap is placed around the pipe or other structure, and the end having the head $a'$ is laid in the shoe with the head engaged with the smaller end of the same. The other end of the rod is then laid in the shoe and in the groove $a^3$ in the head $a'$, and by tightening the nut $b$ and washer $c$ against the larger end of the shoe the band may be contracted around the pipe and clamped in the most secure manner. The structure of the fastening is such that the greater the strain on the band the greater will be the tendency of the ends thereof to retain their engagement with the shoe, and thus an absolutely reliable fastening is provided.

Various changes in the form, proportions, and minor details of my invention may be resorted to at will without departing from the spirit and scope thereof. Hence I consider myself entitled to all such variations as may lie within the scope of my claims.

Having thus described my invention, I claim as new and desire to secure by Letters Patent—

1. The combination of a shoe U-shaped in cross-section, a band having at one end a head, said end of the band lying in the shoe and having the head engaged with one end thereof, a second end of the band also lying in the shoe over the first-named band end and said second end of the band lying at the end of the shoe opposite the end engaged with the said head, and means for adjustably connecting the second-named end of the band with the second-named end of the shoe.

2. The combination of a shoe U-shaped in cross-section, a band having at one end a head, said end of the band lying in the shoe and having the head engaged with one end thereof, a second end of the band also lying in the shoe over the first-named band end and said second end of the band lying at the end of the shoe opposite the end engaged with the said head, means for adjustably connecting the second-named end of the band with the second-named end of the shoe, said head having a groove in its outer side, and the groove receiving the second-named end of the band, for the purpose specified.

In testimony whereof I have signed my name to this specification in the presence of two subscribing witnesses.

ALBERT W. HIGHT.

Witnesses:
W. THAANUM,
C. W. CASLER.